United States Patent
Shimada et al.

(10) Patent No.: US 6,763,131 B1
(45) Date of Patent: Jul. 13, 2004

(54) MODEL REGISTRATION METHOD AND IMAGE PROCESSING APPARATUS

(75) Inventors: Koji Shimada, Kyoto (JP); Masahiro Kawachi, Kyoto (JP); Fumiaki Nakamura, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/446,304

(22) PCT Filed: May 11, 1999

(86) PCT No.: PCT/JP99/02425

§ 371 (c)(1),
(2), (4) Date: Dec. 20, 1999

(87) PCT Pub. No.: WO99/59104

PCT Pub. Date: Nov. 18, 1999

(30) Foreign Application Priority Data

May 12, 1998 (JP) .......................................... 10-129054

(51) Int. Cl.[7] .............................. G06K 9/00; G06K 9/20; G01N 21/00; G03B 17/18
(52) U.S. Cl. ........................ 382/151; 382/312; 382/141; 382/209; 356/237.2; 348/129; 348/131; 396/147
(58) Field of Search ................................ 382/141, 151, 382/209, 312, 217, 218; 348/129–131, 208.11, 208.12, 345; 356/237.2, 243.4; 396/147, 118

(56) References Cited

U.S. PATENT DOCUMENTS

| 4,573,785 | A | * | 3/1986 | Arakawa | ..................... 396/110 |
|---|---|---|---|---|---|
| 5,361,307 | A | * | 11/1994 | Hartley et al. | .............. 382/141 |
| 5,369,430 | A | * | 11/1994 | Kitamura | ..................... 348/130 |
| 5,838,374 | A | * | 11/1998 | Kikuchi | ....................... 348/351 |
| 5,892,991 | A | * | 4/1999 | Hamada et al. | ............. 396/147 |
| 5,969,760 | A | * | 10/1999 | Ernest et al. | ............. 348/219.1 |
| 6,091,996 | A | * | 7/2000 | Whitehead et al. | ......... 382/149 |
| 6,285,787 | B1 | * | 9/2001 | Kawachi et al. | ............ 382/209 |

FOREIGN PATENT DOCUMENTS

| JP | 63-46583 | | 2/1988 |
|---|---|---|---|
| JP | 4-357444 | | 12/1992 |
| JP | 8-327324 | | 12/1996 |
| JP | 09-128536 | * | 5/1997 |

* cited by examiner

Primary Examiner—Jingge Wu
Assistant Examiner—Ryan J. Hesseltine
(74) Attorney, Agent, or Firm—Dickstein Shapiro Morin & Oshinsky LLP

(57) ABSTRACT

A mechanism to produce projection images 40A–40G representing a model extraction region and an image sensing region is incorporated in an image sensing unit 1 of an image processing apparatus. A control unit 2 receives an image from image sensing unit 1 to calculate density deviation within the model extraction region. The calculated result is output to a level display unit 27. When the operator determines the position of image sensing unit 1 so that projection images 40A, 40B and 40C representing the model extraction region are projected distinctly on the pattern of the subject to be registered and a high level value is displayed by level display unit 27 and depresses a teach button switch 30, image data within the current model extraction region is registered as the model image.

6 Claims, 5 Drawing Sheets

MODEL REGISTRATION METHOD AND IMAGE PROCESSING APPARATUS

TECHNICAL FIELD

The present invention relates to the technique of collating an image obtained by shooting a predetermined subject with a model image registered in advance to confirm the subject. Particularly, the present invention relates to a processing method and apparatus to register a model image in the apparatus prior to the confirmation process.

BACKGROUND ART

In the conventional registration process of a model image, the image obtained by shooting a model of an object to be confirmed is displayed on a monitor. The operator specifies an image region that is to be cut out as the model image on the display screen.

In the case where the object to be subjected to the confirmation process has a predetermined pattern, an image region including that pattern and the background area is set. Image data within that region is registered as the model image. In the confirmation process, a correlation operation of the density difference for each corresponding pixel is carried out between the image to be processed and the model image, and the similarity of the pattern found in the two images is obtained for the determination of whether there is a pattern or not and whether the pattern to be confirmed is good or not.

When an image that has small difference in density such as an image in which the ratio of the pattern to the background area is small or an image in which a pattern of uniform density (solid painted pattern) occupies the major area as the model image in this type of confirmation process, the qualification of obtaining a high correlation value for the model image is extremely milder than the case where an image having great difference in density is set as the model image. Therefore, there is a possibility of erroneous confirmation of the pattern even with a small noise on the image when difference in the density is small in the model image. The reliability of the confirmation result will be degraded significantly.

In order to obtain a confirmation result of high accuracy in this type of confirmation process, a model image that has the maximum difference in density should be set.

However, the model image set by the operator's personal view does not necessarily have the appropriate condition. There are many cases where significant error has occurred in the confirmation process due to the improper setting of the model image.

The applicant has proposed a method including the steps of calculating an evaluation value representing the quality of the image in each of an image region to cut out a model image while modifying the size thereof and the like, and employing the image data in the image region corresponding to a desired evaluation value as the model image (Japanese Patent Laying-Open No. 9-128536).

In the above method, a monitor is required for the operator to specify the image region to be cut out, as well as a display control mechanism to display the image and the specified result of the image region on the monitor. The cost for introducing the apparatus is increased and the apparatus scale will become larger. There was a problem that it is unsuitable to install at the testing line and the like of a factory.

The present invention is directed to the above problem. An object is to support the registration process of a model image, and registering an appropriate model image using that support method in order to allow an appropriate model image to be registered simply without having to display the image through a monitor.

DISCLOSURE OF THE INVENTION

An image processing apparatus of the present invention includes an image sensing apparatus generating image data including a plurality of pixels, each pixel including level data, by shooting a subject; an evaluation value calculator calculating an evaluation value representing the appropriateness of using image data included in a registration region defined as the entire or partial of an image sensed region represented by the image data generated by the image sensing apparatus as the test criterion; a casing accommodating at least the image sensing apparatus or the evaluation value calculator; a display provided at the casing to sequentially display a series of calculated evaluation values when the image sensing apparatus shoots a subject repeatedly; and a registration designator for entering designation by the operator that the image data included in the registration region is to be registered as the test criterion.

According to the image processing apparatus of the present invention, the operator can alter the relative position between the image sensing apparatus and the subject to be shot while viewing the level of the evaluation value displayed at the display to input designation to the registration designator when the evaluation value attains a desired value (the appropriateness level is increased), so that image data with high appropriateness as the test criterion can be identified. The evaluation value may take a greater value or a smaller value as the appropriateness for the test criterion becomes greater depending upon the calculation method and the testing system. For example, in the case where the dispersion value of the level data of the pixel included in the registration region is set as the evaluation value, the appropriateness becomes greater as the evaluation value becomes larger when testing is carried out on the basis of the match of the pattern on the subject. In this case, the operator enters designation to the registration designator when the evaluation value takes a large value. In contrast, the appropriateness is greater as the evaluation value becomes smaller in the case where the test indicates "pass" when the region subjected to the test on the subject is plain. The magnitude relationship of the evaluation value can be inverted depending upon the equation for calculating the evaluation value.

The level data included by the pixel forming the image data may be a value representing the light received amount of that pixel. Also, the level data may be one of the parameters representing the color of that pixel. The level data of the pixel is also referred to as "density".

When the registration region is a portion of the image sensed region, the registration region can be defined as the region on an image memory in which the image data generated by the image sensing apparatus is stored. Alternatively, the registration region can be defined at a timing region by the signal timing of the image data sequentially transmitted from the image sensing apparatus.

One or both of the image sensing apparatus and the evaluation value calculator can be accommodated in the casing. In the case where the image sensing apparatus is stored in the casing, the operator can easily adjust the relative position between the image sensing apparatus and the image sensed subject while viewing the display since the display is provided at the casing. In this case, the evaluation value calculator can be stored in the casing. Alternatively, the evaluation value can be obtained from an evaluation value calculator provided outside the casing for display. When the evaluation value calculator is stored in the casing and the image sensing apparatus is provided outside the casing, the adjustment operation is facilitated by installing the casing so that the operator that adjusts the position of the image sensing apparatus can visually confirm the display provided in the casing.

As to the sequential display of an evaluation value by the display, the evaluation value can be displayed for every image data generated by the image sensing apparatus. Alternatively, the evaluation value can be displayed corresponding to a portion of the image data such as displaying an evaluation value once for every several times of generation of the image data. The registration designator is preferably a switch such as a depression button that can be manipulated by the operator. Registration designation is also referred to as "teaching". The input applied to the registration designator functions as the designation to register the current image data included in the registration region as the test criterion. The image data that becomes the subject of registration by this designation can be stored in the image processing apparatus. Alternatively, this designation and the image data set as the subject of registration by this designation can be provided outside the image processing apparatus and have the subsequent process carried out by another apparatus. The image data that is set as the subject of registration by this designation is stored inside or outside the image processing apparatus to be compared with another set of image data obtained by shooting a subject of testing.

The evaluation value indicating the appropriateness as the test criterion is preferably the level of variation of the level data belonging to the pixel included in the registration region. The evaluation value is typically the dispersion value of the level data.

The display can provide the evaluation value in numerics or in the form of a graph. The operator can identify the magnitude of the evaluation value more quickly when displayed in the graphical format. Particularly, display in the bar graph formed is preferable.

The image sensing apparatus further includes a projector for projecting an image indicating the range of the registration region on a subject. The operation of registering the test criterion is more facilitated since the operator can confirm the range of the registration region on the subject by the projected image. A projector that projects an image indicating the range of an image sensing region can be provided instead of the projector that projects an image indicating the range of the registration region. The operator can identify the rough range of the registration region on the subject by the projected image according to the relationship with the range of the image sensing region. It is needless to say that the operator can estimate the range of the registration region by the position relationship between the camera that functions as the image sensing apparatus and the subject even when an image is not projected on the subject.

The image processing apparatus of the present invention can include the function as a test apparatus by including a test criterion data memory storing image data included in the registration region when designation is input to the registration designator as the test criterion, a match level calculator calculating the match between the image data generated from the image sensing apparatus and the stored test criterion data, and a determinator providing the determination result of whether the match level is greater than a predetermined threshold value.

In a preferable embodiment of the present invention, the display provides the evaluation value when image data is to be registered as the test criterion and the value indicating the match when the match level is calculated. Since the evaluation value and the match level will not be displayed at the same time, the apparatus can be reduced in size by switching between these displays with the same display.

A registration method of a test criterion image of the present invention includes the steps of repeatedly shooting a subject to obtain a series of image data by an image sensing apparatus that generates image data including a plurality of pixels, each pixel including level data, by shooting a subject; sequentially calculating, according to the repetitive shooting, an evaluation value representing the appropriateness of using the image data included in a registration region defined as the entire or a portion of the image sensing region represented by the image data generated by the image sensing apparatus as the test criterion; adjusting the relative position between the image sensing apparatus and the subject while referring to the evaluation value; and storing as the test criterion the image data included in the registration region when the evaluation value attains a desired value.

In the preferable embodiment of the present invention, the calculated evaluation value is sequentially displayed so that the operator can adjust the relative position between the image sensing apparatus and the subject while referring to the displayed evaluation value. Also, the image sensing apparatus or the subject can be attached to a moving device such as a robot arm to have the relative position between the image sensing apparatus and the subject adjusted by controlling the moving device according to the process of a computer program so that the evaluation value attains a desired value such as a value larger than or smaller than a predetermined threshold value, or a maximal value or minimum value.

In the preferable embodiment of the present invention, the image data included in the registration region can be stored as the test criterion in response to designation by the operator when the operator determines that the evaluation value has attained a desired value. In the determination of whether the evaluation value has attained the desired value or not, the operator does not necessarily have to carry out determination on the basis of comparison with a predetermined threshold value. The operator can provide designation when a relatively large or small evaluation value has been obtained in that state. The operator can also provide designation taking into account which portion on the subject the image is to be registered in addition to the magnitude of the evaluation value. The determination can be made, not by the operator, but by a computer program process. Designation can be provided when the evaluation value attains a desired value, for example, attains a value larger than or smaller than a predetermined threshold value, or attains the maximal value or the minimum value.

BEST MODE FOR PRACTICING THE INVENTION

Figure 1:
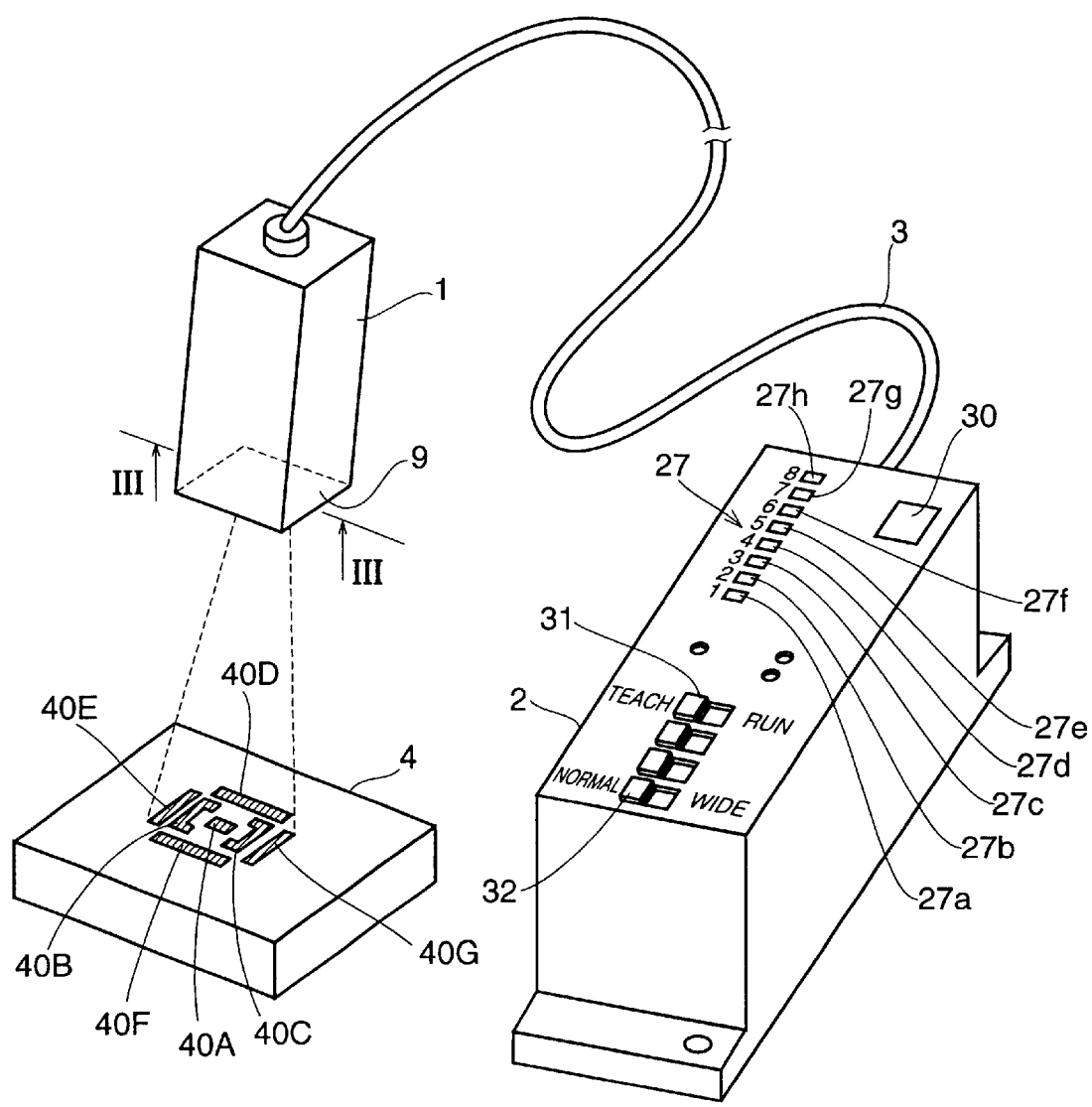
FIG. 1 is a perspective view showing an appearance of a test apparatus according to an embodiment of the present invention.

An embodiment of the present invention will be described hereinafter with reference to the drawings. Referring to FIG. 1, a test apparatus according to an embodiment of the present invention picks up an image of a subject 4 on which a pattern such as characters are drawn thereon to check whether the drawn state of the pattern is good or not. The test apparatus is constituted having an image sensing unit (CCD camera) 1 as the image sensing apparatus and a control unit 2 for processing the image generated by image sensing unit 1 connected with a cable 3 for the image.

Each subject 4 that is to be tested is sequentially transported through a line (not shown) such as a belt conveyor. Image sensing unit 1 is sized so as to be held by one's hand to be supported at an image sensing position identified by the user (called "operator" hereinafter) in the teaching mode. Then, in the test mode, image sensing unit 1 is supported by a support member not shown to sequentially shoot each subject 4 to generate a still image thereof. Control unit 2 arranged in the proximity of the test line sequentially receives an image from image sensing unit 1 to determine whether each subject 4 is good or not. The determination result is output.

The test apparatus is constituted without a monitor for the purpose of reducing the cost and the installation space of the apparatus. Prior to the inspection, positioning of image sensing unit 1 and the registration process of a model image (image data to be registered as test criterion) are carried out using a projection picture (details described afterwards) projected by image sensing unit 1. At the top face of the casing of control unit 2 are provided, in addition to various switches required for the registration process and setting during the test operation, a teach button switch (registration designator) 30 that is depressed during the registration process of a model image, a level display unit (display) 27 (details described afterwards) having eight light emitting displays 27a–27h arranged vertically.

Figure 2:
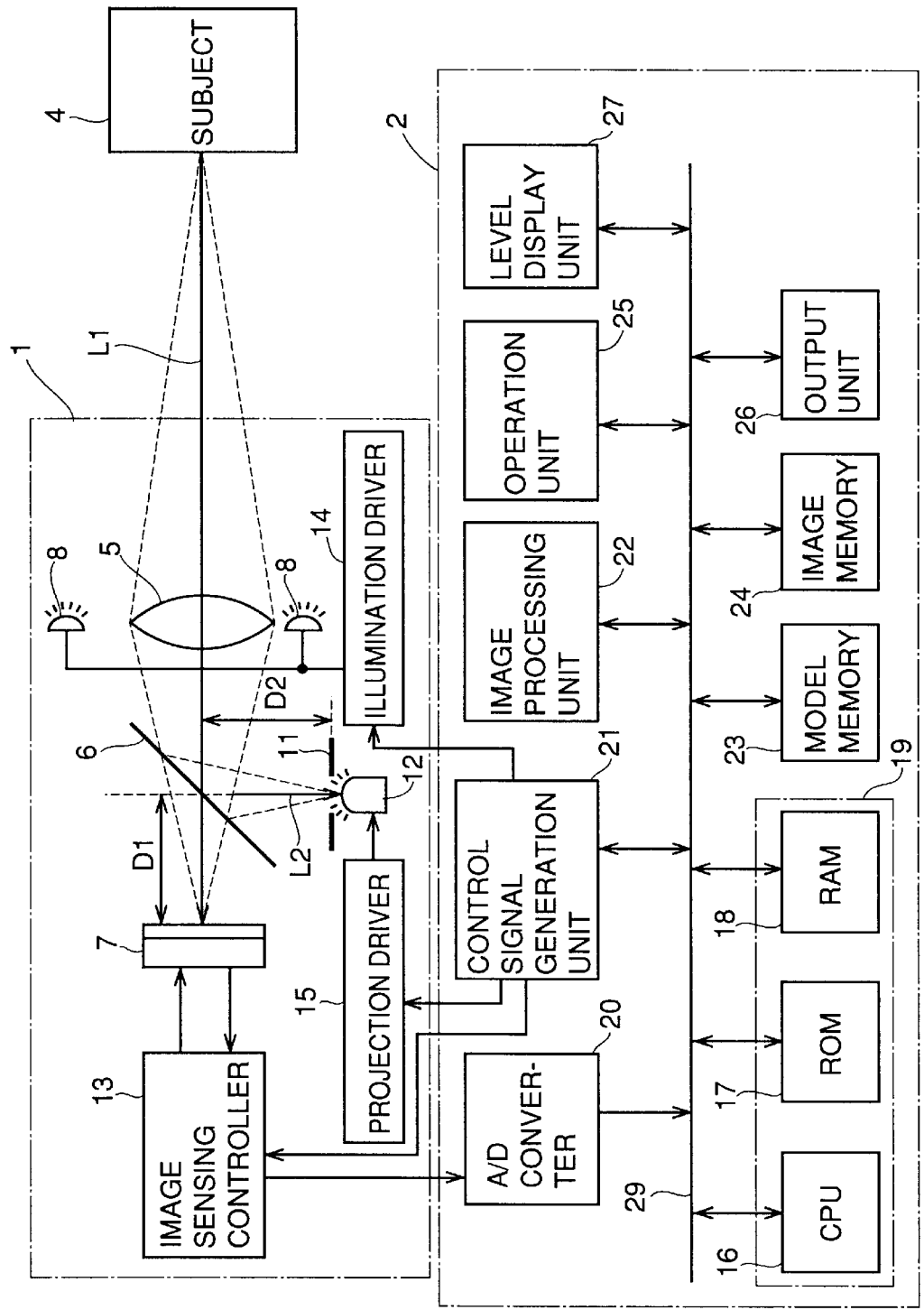
FIG. 2 is a block diagram showing a structure of a test apparatus.

FIG. 2 shows the internal structure of a test apparatus.

Inside the casing of image sensing unit 1 are provided a lens 5 at the front opening that faces subject 4, as well as a half mirror 6 and a two-dimensional solid state image sensing device 7 such as a CCD (referred simply as "image sensing device 7" hereinafter) sequentially arranged on an optical axis L1 of lens 5.

Figure 3:
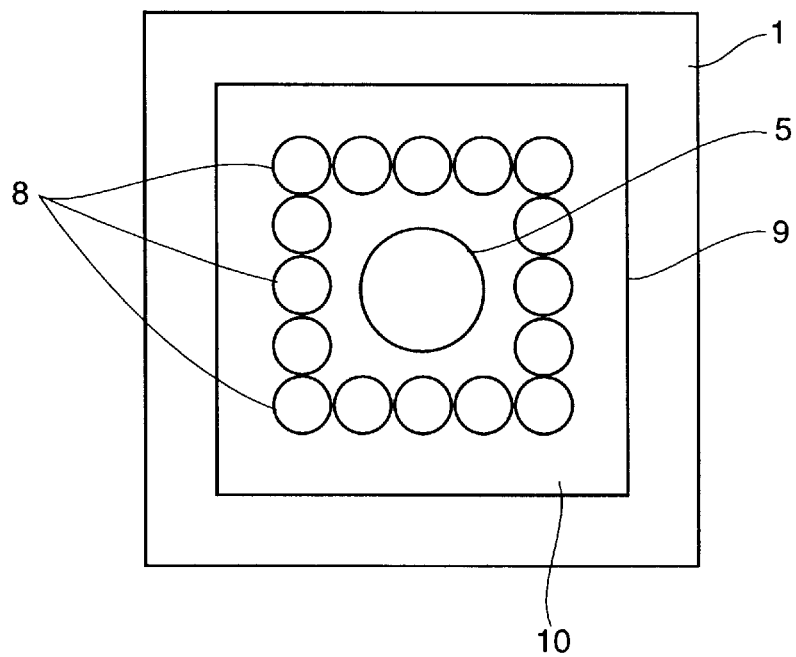
FIG. 3 is a front view showing the arrangement of the lens and illumination light source.

FIG. 3 shows a view in the direction of the arrow III—III of FIG. 1. As shown in FIG. 3, lens 5 is arranged corresponding to the center position of opening window 9 at front of the casing. Also, a plurality (16 in the embodiment) of light sources 8 for illumination are arranged around lens 5. A diffusion plate 10 to diffuse the emitted light from illumination light source 8 outwards is fitted at opening window 9. Diffusion of light is inhibited at the center of diffusion plate 10 to secure the field of view to be shot.

Half mirror 6 is arranged inclined 45 degrees with respect to optical axis L1. A slit plate 11 for projection and a light source 12 are sequentially arranged on an optical axis L2 at the reflecting direction side of half mirror 6. In the casing are further provided an image sensing controller 13 to adjust the charge storage time of image sensing device 7, an illumination driver 14 to control the turn-on operation of each light source for illumination, a projection driver 15 to control the turn-on operation of the light source for projection, and the like.

Figure 4:
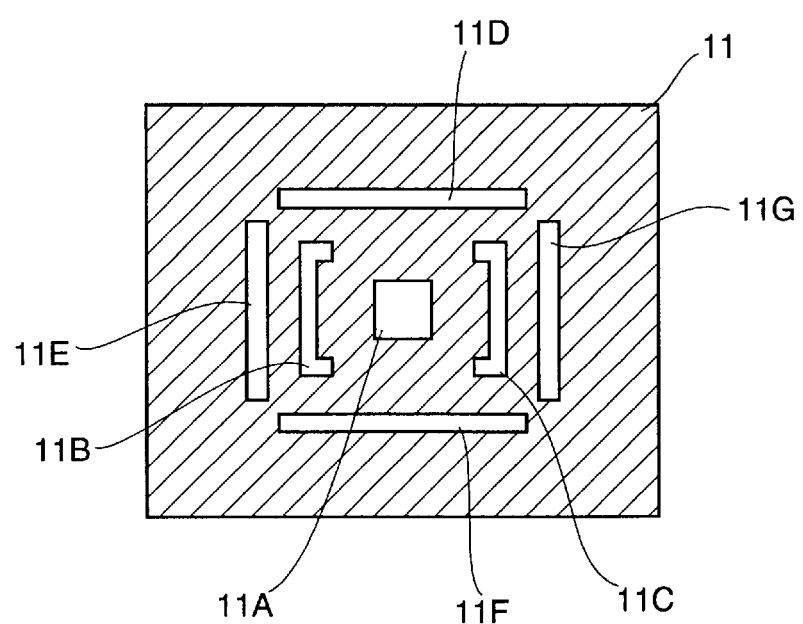
FIG. 4 is a front view showing a structure of a slit plate.

A square slit hole 11A of a predetermined size is formed at the plane of slit plate 11, as shown in FIG. 4. Also, a pair of slit holes 11B and 11C exhibiting a bracket pattern are provided at the left and right sides of slit hole 11A. Furthermore, four strip-like slit holes 11D, 11E, 11F and 11G are formed around the three slit holes 114A–11C so as to constitute a rectangular pattern.

Light emitted from light source 12 passes through each of slit holes 11A–11G to be projected on subject 4 via half mirror 6 and lens 5. Projection images 40A–40G corresponding to the shape of each of slit holes 11A–11G, respectively, are generated on subject 4, as shown in FIG. 1.

Among projection images 40A–40G, the outer four projection images 40D–40G represent the boundary of the image sensing region of image sensing unit 1. The center square projection image 40A represents the position and size of a registration region to cut out a model image for registration as the test criterion (referred to as "model extraction region" hereinafter). Projection images 40B and 40C forming a bracket-like pattern are used when it is necessary to register an image of a range greater than the normal range as the model image. The model extraction region is represented by the region surrounded by each of projection images 40B and 40C.

In image sensing unit 1 of the present embodiment, the distance D2 between slit plate 11 and half mirror 6 is set to be equal to the distance D1 between image sensing device 7 and half mirror 6. By adjusting the vertical position of image sensing unit 1 so that a clear projection image is produced on the subject in the positioning operation of image sensing unit 1, a distinct image can be formed at the region surrounded by the circumferential projection images 40D–40G on image sensing device 7.

By using an LED for red light as each illumination light source 8 and an LED for green light as light source 12 for projection in the present embodiment, a green projection image can be produced within an image sensing region illuminated in red to facilitate the visual identification of the projection image for the operator.

Control unit 2 includes a microcomputer 19 constituted by a CPU 16, ROM 17 and a RAM 18, an A/D converter 20 connected to microcomputer 19 via a system bus 29, a control signal generation unit 21, an image processing unit 22, a model memory (test criterion data memory) 23, an image memory 24, an operation unit 25, an output unit 26, a level display 27 and the like. Microcomputer 19 functions as an evaluation value calculator, a match level calculator, and a determinator.

A/D converter 20 function to digital-convert an analog image signal from image sensing unit 1. The converted digital image is stored in image memory 24, and appropriately read out by image processing unit 22.

Control signal generation unit 21 provides a control signal to image controller 13, illumination driver 14, and projection driver 15 of image sensing unit 1 to control the image sensing operation of image sensing device 7 and the series of light emitting operations by light sources 8 and 12. In the present embodiment, a control signal is applied simultaneously from control signal generation unit 21 to image sensing controller 13 and illumination driver 14 to establish synchronization between the shutter time on the part of image sensing device 7 and the illuminating time by light source 8 for illumination, whereby the light amount of illumination is adjusted and introduction of noise onto the image caused by disturbance light is prevented. Also, a control signal is applied to light source 12 for projection at a timing deviated from the charge storage time of image sensing unit 1 so that projection images 40A–40G are not imaged on the image subjected to be processed.

However, light sources 8 and 12 are perceived to be turned on virtually at the same time since the deviation in timing of each control signal is in the unit of several msec.

Operation unit 25 includes, in addition to the aforementioned teach button switch 30, a mode switch 31 to switch the apparatus to either the teaching mode or the testing mode, a region switch 32 (both shown in FIG. 1) to switch the size of the cut out region of the model image in the teaching mode, and the like. Each of displays 27a–27h of level display unit 27 is assigned the level number of "1"–"8", respectively. By sequentially turning on a predetermined number of displays starting from the display of the lowest level, the appropriateness of the input image as a model image in the teaching mode and the matching level of the input image with respect to the model image in the testing mode are appropriately displayed in a graphical manner.

Output unit 26 corresponds to the interface to output the test result outwards, and is connected to an output cable not shown.

After a good model of subject 4 is transported and placed at a predetermined position during the teaching mode prior to the testing mode in the test apparatus of the above structure, the operator moves image sensing unit 1 held with his/her hand above the model and searches for an appropriate image sensing position to generate a model image. In this case, the projection position of each of projection images 40A–40G is also shifted in response to the movement of image sensing unit 1. Therefore, the operator can identify the current image sensing region and position of the model extraction region by respective projection images.

When image sensing unit 1 is operated and the generated image data is input in image memory 24 under this state, image processing unit 22 sets the model extraction region at the predetermined position of that image, and calculates the density dispersion value within the model extraction region as the evaluation value representing the appropriateness of the image in the region as the model image. CPU 16 receives this evaluation value and sets the level thereof according to a predetermined standard. The result is provided to level display unit 27.

In the model extraction region, the density deviation V is calculated by the following equation (1) where N is the total number of pixels in the region, P (i) is the number of pixels with a predetermined density i (i=0–255), and $\mu$ is the density average value in the region.

Density average value $\mu$ is calculated by equation (2).

$$V = \left\{ \sum_{i=0}^{255} (i-\mu)^2 \times P(i) \right\} / N \quad (1)$$

$$\mu = \left\{ \sum_{i=0}^{255} (i \times P(i)) \right\} / N \quad (2)$$

As mentioned in the section of the background art, it is desirable to register a model image that has the maximum variation in density in order to obtain a confirmation result of high accuracy by the matching process.

According to the above configuration, the operator can identify the set position of the model extraction region by projection image 40A or projection images 40B and 40C, and also the appropriateness of the image extracted at that set position as a model image according to the level display of level display unit 27. When projection images 40A, 40B and 40C are projected on the pattern to be identified and the operator depresses teach button switch 30 after positioning image sensing unit 1 corresponding to the position where display of a high level such as "7" or "8" is provided on level display unit 27, an appropriate image as a model image is selected and registered in model memory 23.

By carrying out image pickup while sequentially setting various types of image sensing conditions such as modifying the shutter time of image sensing unit 1, the illumination time, the illumination light amount and the like to extract a model image from the images obtained during one round of the image sensing conditions and that takes the maximum value for the evaluation value, a model image that has the more favorable picture quality can be registered in the registration process of a model image. By also registering the image shooting condition when this ideal model image has been obtained and processing an image obtained by shooting the subject of testing according to similar image sensing conditions, the determination accuracy of the subject can be further improved.

Figure 5:
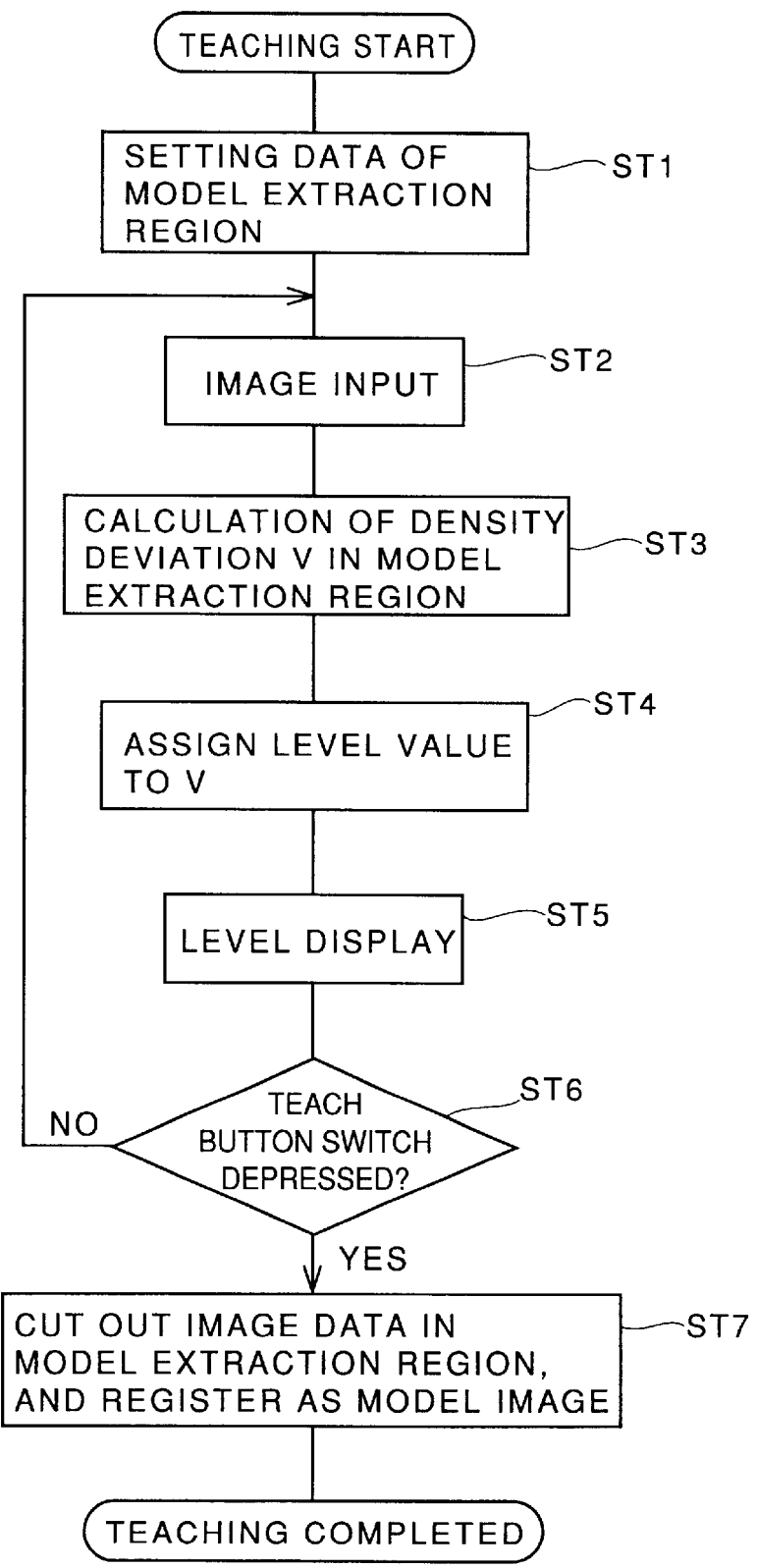
FIG. 5 is a flow chart representing the process procedure of a teaching mode.
Figure 6:
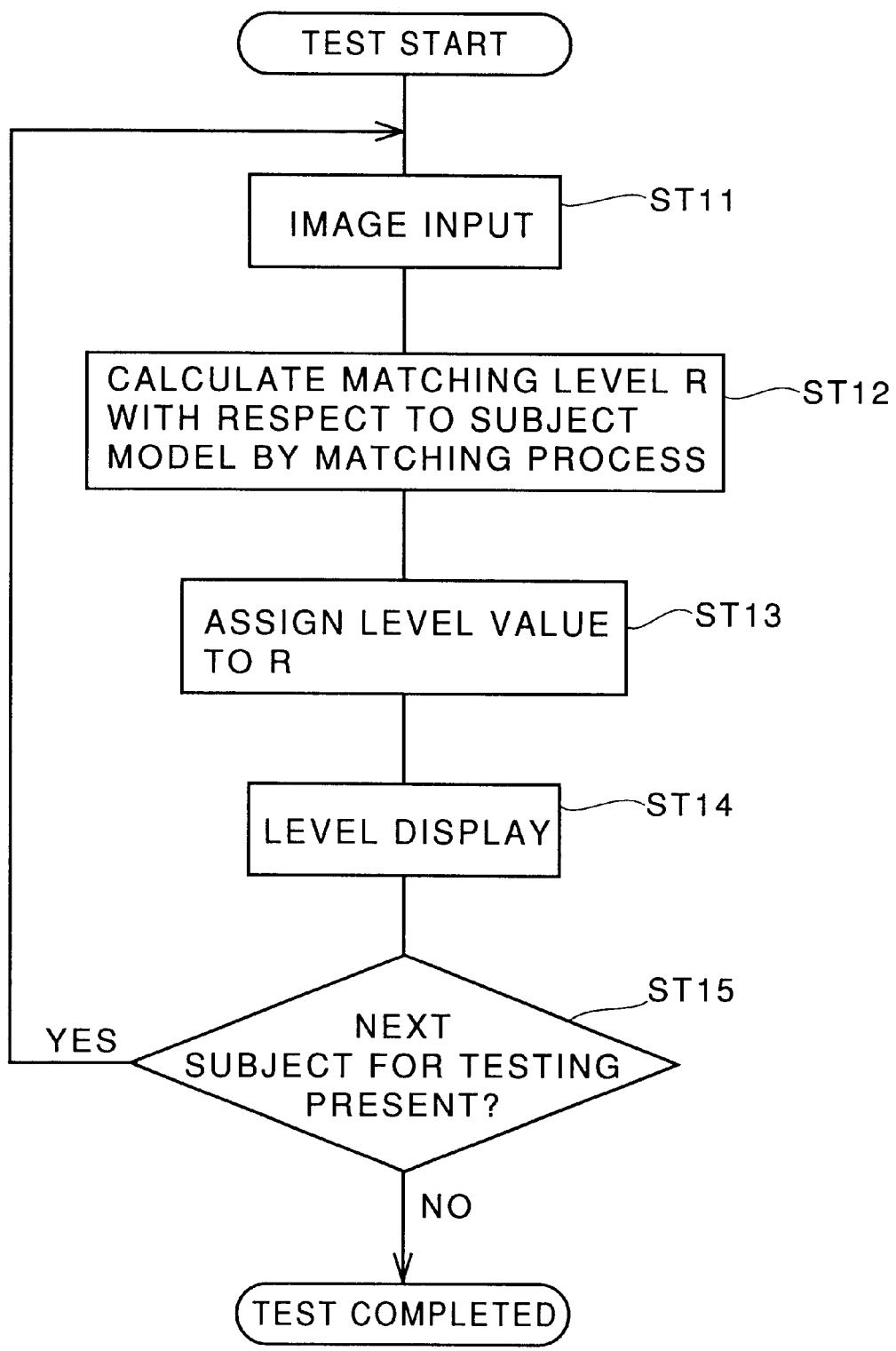
FIG. 6 is a flow chart representing the process procedure of testing.

FIG. 5 represents the processing procedure during the teaching mode (ST1–7) in control unit 2, and FIG. 6 represents the processing procedure (ST11–15) in the testing mode. The algorithm thereof is initiated by setting mode switch 31. When mode switch 31 is set at the TEACH side, as shown in FIG. 1, the process of FIG. 5 is implemented. Following the arrangement of image sensing unit 1 at the image sensing position identified in the teaching mode, the process of FIG. 6 is initiated upon switching mode switch 31 to the RUN side.

The algorithm of FIG. 6 is based on the assumption that subject 4 of testing is transported at the same position and posture as to those of the model of the teaching mode. When subject 4 for testing is transported at a state different from that of the model of teaching operation, a process to correct the position and posture of subject 4 must be carried out prior to the process of FIG. 6.

Before the teaching mode is to be implemented, the operator sets mode switch 31 to the TEACH side and: also sets region switch 32 to either NORMAL or WIDE according to the size of the model image to be registered. In response, CPU 16 sets the position data to set the model extraction region (referred to as "set data of model extraction region" hereinafter) in image processing unit 22 simultaneous to initiation of the teaching mode (ST1). In this case, the image region corresponding to center projection image 40A and the image region corresponding to the region enclosed by projection images 40B and 40C are set as the model extraction region when switch 32 is set to the NORMAL and WIDE side, respectively.

The set data of the model extraction region is the coordinate data corresponding to the left upper vertex and right lower vertex of the region, for example.

Then, a control signal is output from control signal generation unit 21 towards image sensing unit 1, whereby an image of the model is picked up at a predetermined timing. This image data is digital-converted by A/D converter 20, and then stored in image memory 24 (ST2).

Image processing unit 22 sets the model extraction region according to the above set data on the image, and calculates density deviation V for the image data in that region according to equation (1) (ST3). CPU 16 compares the calculated density deviation V with a threshold value of 7 stages, and applies the level value of any of "1"–"8" to the above calculated value (ST4).

Although the threshold value to apply the level of density deviation V is based on a value stored in advance in RAM 18 and the like, the value can be modified appropriately by a setting switch not shown.

At ST5, CPU 16 turns on an appropriate number of displays starting from display 27a of the lowest level according to the level value assigned to density deviation V in level display unit 27 (ST5). By this level display, the operator can determine the level of appropriateness of the current image in the model extraction region as a model image at a glance.

During this series of processes, control signal generation unit 21 applies the control signal for projection light source 12 to image sensing unit 1, whereby each of projection images 40A–40G is projected on the model. The operator confirms the portion of the image data that corresponds to the extraction region by projection image 40A (or 40B, 40C) representing the current model extraction region, and also confirms the appropriateness of the current extracted image data as a model image by the level display of level display unit 27. The operator adjusts the up and down and left and right set values for image sensing unit 1 until the projection image is formed distinctly on the pattern subjected to registration process and until a high level value is displayed by level display unit 27. At control unit 2, the process of ST2–5 is carried out every time a new image is input according to the operator's setting.

When an image of a level greater than a predetermined value is obtained, the operator determines that current image at the image sensing position as appropriate, and depresses teach button 30. In response, determination is made of "YES" at ST6, and the program proceeds to ST7. The image data of the model extraction region on the currently obtained image is cut out and registered in model memory 23 as the model image.

The testing mode will be described hereinafter. When the first subject 4 is transported in the testing mode, an image is picked up at a predetermined timing. The digital image to be processed is stored in image memory 24 (ST11).

Image processing unit 22 reads out the model image registered in model memory 23 and scans with respect to the input image. The level of similarity with respect to the model image is calculated for each scanning position according to a normalization correlation operation or the like. Eventually, the maximum value R out of the similarity levels is extracted. This maximum value R is identified as the matching level with respect to a good model of the subject (ST12). Similar to density deviation V in the teaching operation, CPU 16 assigns the level value of any of "1"–"8" to this matching level R. That level value is displayed graphically by means of level display unit 27 (ST13, 14). Accordingly, the operator can confirm in detail and instantly how much the subject of testing is good or not.

Then, the next subject 4, if any, is transported, whereby YES is determined at ST15. Accordingly, the testing according to the procedure of the above-described ST11–14 is carried out. Each subsequent subject 4 is sequentially transported and subjected to testing. When the testing has been completed for all the subjects 4, determination of NO is made at ST15. Thus, the testing ends.

According to the above process, a determination result of extremely high reliability can be obtained by referring to projection image 40A (or 40B, 40C) and the level display by level display unit 27 in the teaching mode and registering an appropriate model image. Since a model extraction region can be set through the projection image and the evaluation value display without using a monitor, the configuration can be simplified. The cost required for introducing the apparatus and the space can be reduced significantly.

Furthermore, the operator can determine instantly whether the image data of the model extraction region is appropriate or not and whether the subject is good or not to implement the process speedily since the evaluation value and matching level are represented in the levels of numerics "1"–"8".

The testing apparatus of the present above embodiment has image sensing unit 1 moved with respect to subject 4 in the teaching mode. However, the position of image sensing unit 1 can be fixed and the position of subject 4 moved instead. The relative positioning between image sensing unit 1 and subject 4 can be adjusted by moving respective elements. In the present embodiment, the operator carries image sensing unit with his/her hand for movement. However, an adjustment mechanism can be attached to image sensing unit 1 to allow position adjustment in a mechanical manner.

Although level display unit 27 is provided at the top plane of the casing of control unit 2 in the above embodiment, level display unit 27 can alternatively be provided on the casing of image sensing unit 1.

It is postulated that a subject having a predetermined pattern is to be confirmed by the matching process with the model image in the above embodiment. In the case where the average density is to be compared between an image that is the subject of testing such as a plain subject with no pattern and a model image, a method differing from that of the above embodiment is carried out.

Since it is necessary to register an image having a uniform density distribution as a model image in such testing, an image sensing position in which the density deviation value within the model extraction region takes the minimum value is searched for, so that a model image is extracted from the image of the currently identified image sensing position for registration.

Industrial Field of Applicability

An image processing apparatus of the present invention can register a model image appropriate for the confirmation process while referring to an evaluation value. Therefore, registration of an appropriate model image can be carried out simply and at a low cost without using a monitor.

What is claimed is:

1. An image processing apparatus, comprising:
    an image sensing apparatus, generating image data by shooting a subject, said image data including a plurality of pixels, wherein each pixel contains level data;
    an evaluation value calculator calculating an evaluation value representing appropriateness of using image data included in a registration region defined as the entire or a portion of an image sensing region represented by the image data generated by said image sensing apparatus as a test criterion;
    a casing accommodating at least the image sensing apparatus or evaluation value calculator;
    a display provided at said casing, said evaluation value calculator sequentially activating one of a plurality of display devices within said display, each of said display devices serially indicating a calculated evaluation value when said image sensing apparatus repeatedly shoots a subject;

a projector, said projector projecting an image indicating a range of said registration region or a range of said image sensing region onto the subject; and a registration designator entering designation by an operator that image data included in said registration region is to be registered as the test criterion.

2. The image processing apparatus according to claim 1, wherein said evaluation value is a magnitude of variation of level data belonging to a pixel included in said registration region.

3. The image processing apparatus according to claim 1, wherein said display provides display of said evaluation value in a graph form.

4. The image processing apparatus according to claim 1, further comprising:

a test criterion data memory storing image data included in said registration region as the test criterion when designation is input to said registration designator;

a match level calculator calculating a match level between image data generated from said image sensing apparatus and said stored criterion data; and a determinator providing a determination result according to comparison between said matching level and a predetermined threshold value.

5. The image processing apparatus according to claim 4, wherein said display provides display of said evaluation value when image data that becomes the test criterion is to be registered and a matching level when said matching level is calculated.

6. A registration method of a test criterion image comprising the steps of:

generating image data by shooting a subject, said image data including a plurality of pixels, wherein each pixel contains level data;

calculating an evaluation value representing appropriateness of using image data included in a registration region defined as the entire or a portion of an image sensing region represented by the image data generated by said image sensing apparatus as a test criterion;

sequentially activating one of a plurality of display devices within a display, each of said display devices serially indicating a calculated evaluation value when said image sensing apparatus repeatedly shoots a subject; and entering a designation by an operator that image data included in said registration region is to be registered as the test criterion.

* * * * *